(12) United States Patent
Uehata

(10) Patent No.: US 11,660,944 B2
(45) Date of Patent: May 30, 2023

(54) VEHICLE DOOR

(71) Applicants: TOYOTA JIDOSHA KABUSHIKI KAISHA, Aichi-ken (JP); SUBARU CORPORATION, Tokyo (JP)

(72) Inventor: Masami Uehata, Toyota (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/679,100

(22) Filed: Feb. 24, 2022

(65) Prior Publication Data

US 2022/0314761 A1 Oct. 6, 2022

(30) Foreign Application Priority Data

Apr. 1, 2021 (JP) .............................. JP2021-062909

(51) Int. Cl.
| | |
|---|---|
| *B60J 10/00* | (2016.01) |
| *B60J 10/21* | (2016.01) |
| *B60J 10/86* | (2016.01) |
| *B60J 10/15* | (2016.01) |
| *B60J 10/246* | (2016.01) |
| *B60R 13/04* | (2006.01) |
| *B60J 10/27* | (2016.01) |

(52) U.S. Cl.
CPC .............. *B60J 10/21* (2016.02); *B60J 10/15* (2016.02); *B60J 10/246* (2016.02); *B60J 10/27* (2016.02); *B60J 10/86* (2016.02); *B60R 13/04* (2013.01)

(58) Field of Classification Search
CPC . B60J 10/21; B60J 10/15; B60J 10/246; B60J 10/27; B60J 10/86; B60R 13/04
USPC ...................................... 49/377, 479.1, 498.1
See application file for complete search history.

(56) References Cited

U.S. PATENT DOCUMENTS

| | | | |
|---|---|---|---|
| 5,261,188 A | * 11/1993 | Vaughan | B60J 10/75 49/377 |
| 2017/0274748 A1 | * 9/2017 | Masumoto | B60J 10/75 |

FOREIGN PATENT DOCUMENTS

| | | | | |
|---|---|---|---|---|
| JP | 3133810 B2 | | 2/2001 | |
| KR | 102163019 | * | 10/2020 | B60J 10/86 |

* cited by examiner

*Primary Examiner* — Janet M Wilkens
*Assistant Examiner* — Daniel Alvarez
(74) *Attorney, Agent, or Firm* — Hauptman Ham, LLP

(57) ABSTRACT

A vehicle door includes a door panel, a corner piece that is disposed at a door waist portion of the door panel and that includes a protrusion, a weather strip that is disposed to extend along an outer peripheral edge of the door panel and that has a hole portion with which the protrusion is engaged, and a door trim that is disposed to cover the corner piece. The protrusion has a hollow structure and includes an outer peripheral side wall, and an opening is provided in a part of the outer peripheral side wall.

4 Claims, 9 Drawing Sheets

VEHICLE DOOR

CROSS-REFERENCE TO RELATED APPLICATION

This application claims priority to Japanese Patent Application No. 2021-062909 filed on Apr. 1, 2021, incorporated herein by reference in its entirety.

BACKGROUND

1. Technical Field

The technology in the disclosure relates to a vehicle door.

2. Description of Related Art

Japanese Patent No. 3133810 discloses a structure connecting a corner piece of a vehicle door and a weather strip.

SUMMARY

The corner piece and the weather strip may be connected by engaging a hole portion formed in the weather strip with a protrusion formed on the corner piece. When a distal end of the protrusion and a reverse face of a door trim come into contact with each other, a position, in a height direction, of an upper face of the door trim at a door waist portion moves upward due to the presence of the protrusion. The degree of freedom in design is reduced.

A vehicle door according to one aspect of the disclosure includes a door panel. The vehicle door includes a corner piece that is disposed at a door waist portion of the door panel, the corner piece including a protrusion. The vehicle door includes a weather strip that is disposed to extend along an outer peripheral edge of the door panel, the weather strip having a hole portion with which the protrusion is engaged. The vehicle door includes a door trim that is disposed to cover the corner piece. The protrusion has a hollow structure and includes an outer peripheral side wall. An opening is provided in a part of the outer peripheral side wall.

In the vehicle door according to the aspect of the disclosure, the protrusion has a hollow structure, and an opening is formed in a part of the outer peripheral side wall. Accordingly, the compressive rigidity of the protrusion can be reduced. Thus, when a distal end of the protrusion and a reverse face of the door trim come into contact with each other, the protrusion can be deformed by applying compressive force to the protrusion, and the height of the protrusion can be lowered. The position of the upper face of the door trim at the door waist portion can be lowered, and accordingly the degree of freedom in design can be increased.

A distal end of the protrusion may be closed. The opening may be connected to a hollow space defined inside the protrusion. The compressive rigidity of the protrusion can be reduced by this protrusion shape, as well.

An area of the opening in a region from a middle position between the distal end of the protrusion and a basal portion of the protrusion to the distal end of the protrusion may be larger than an area of the opening in a region from the middle position to the basal portion of the protrusion. Thus, the compressive rigidity on the side of the distal end of the protrusion can be made lower than the compressive rigidity on the side of the basal portion of the protrusion. The protrusion can be compressed and deformed, while the rigidity of the basal portion is ensured.

The protrusion may have a tubular shape with a distal end that is open. The opening may be a slit extending from the distal end of the protrusion toward a basal portion of the protrusion. The compressive rigidity of the protrusion can be reduced by this protrusion shape, as well.

A width of the slit on a side of the distal end of the protrusion may be larger than a width of the slit on aside of the basal portion of the protrusion. Thus, the compressive rigidity on the side of the distal end of the protrusion can be made lower than the compressive rigidity on the side of the basal portion of the protrusion.

A leading end of the slit may not reach the basal portion of the protrusion. As a result, the rigidity of the basal portion can be ensured, and damage to the protrusion can be suppressed.

Details and further improvements of the technology disclosed herein are described in the "DETAILED DESCRIPTION OF EMBODIMENTS" section below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
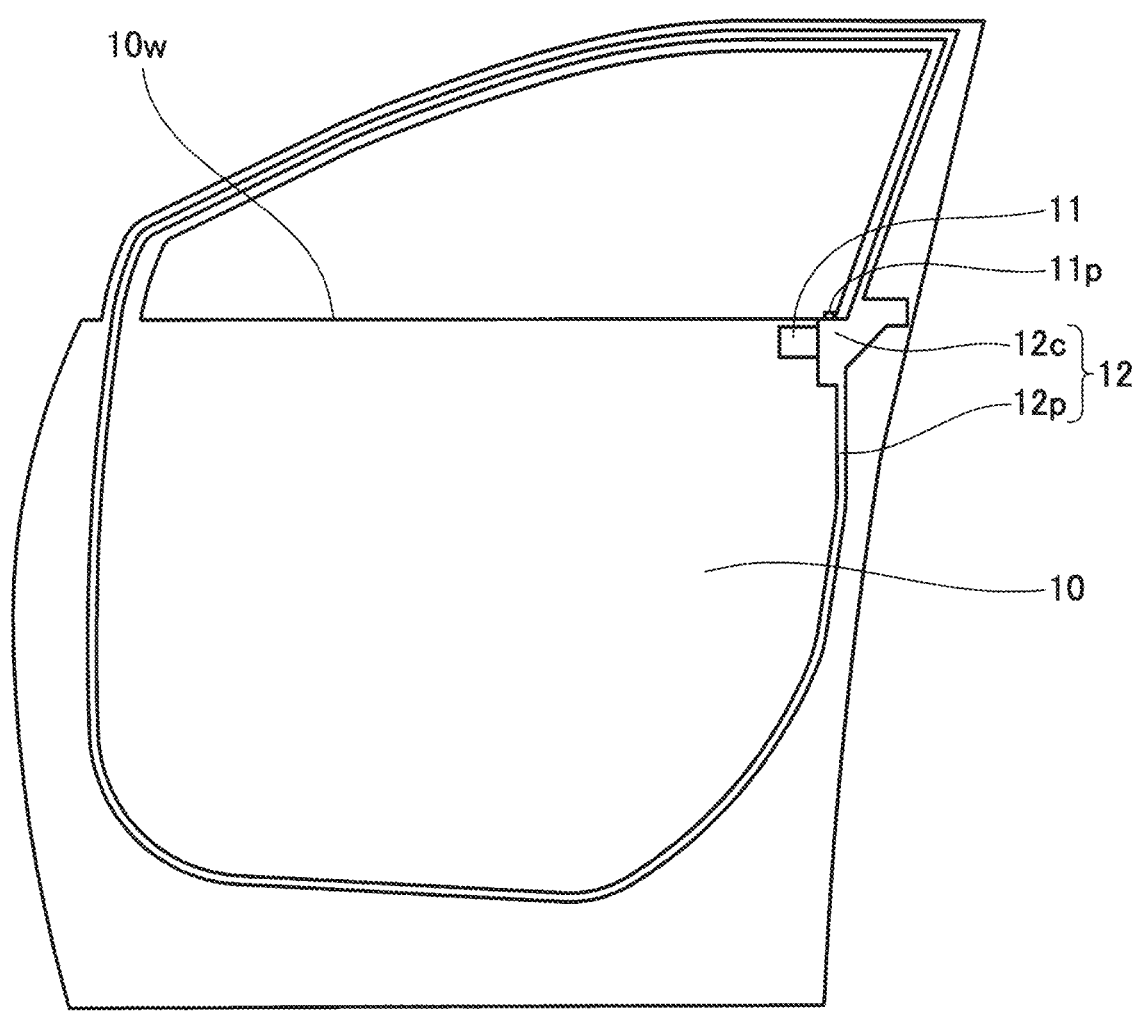
FIG. 1 is a side view of a side door 1 in a front side of a vehicle.
Figure 2:
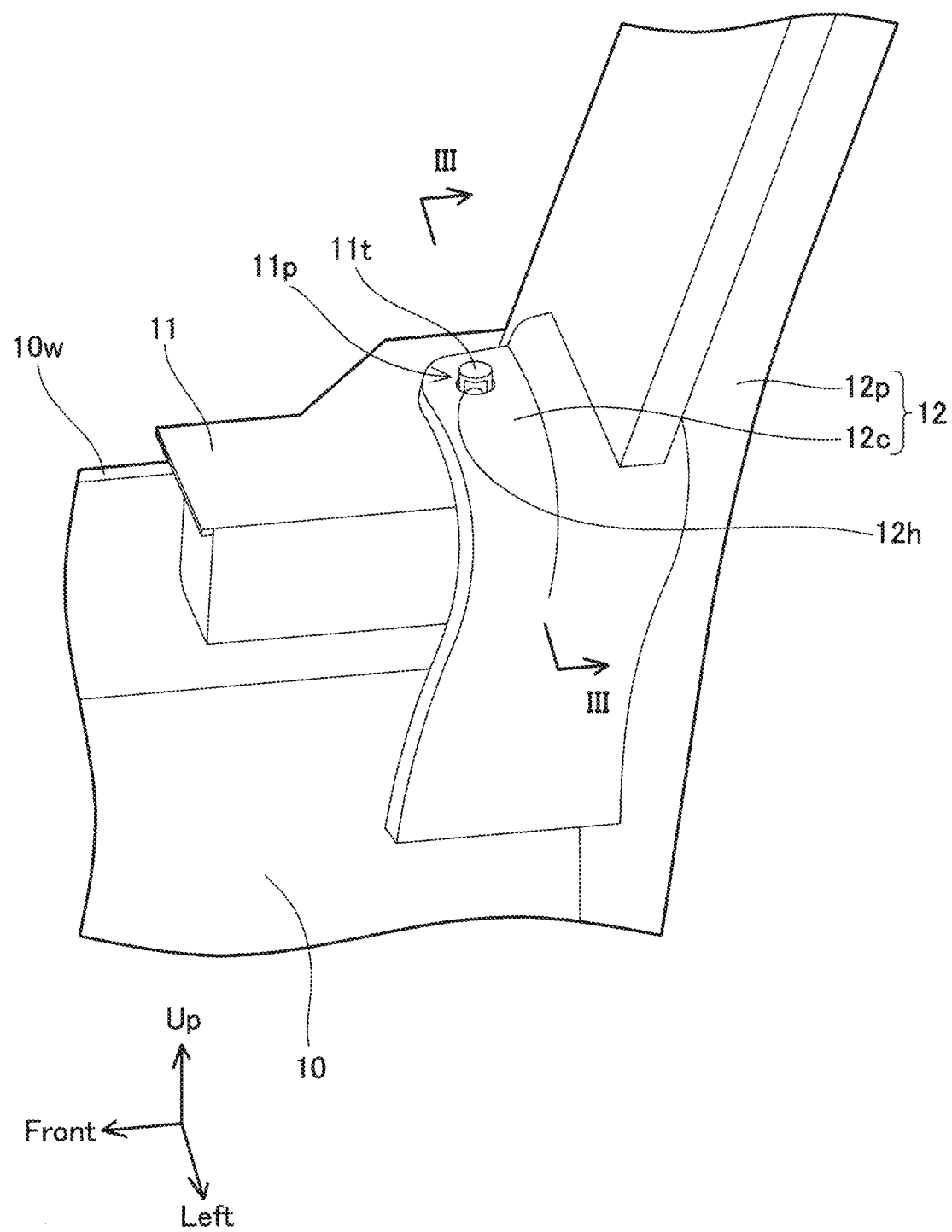
FIG. 2 is an enlarged perspective view of a corner piece 11 and the vicinity thereof.
Figure 3:
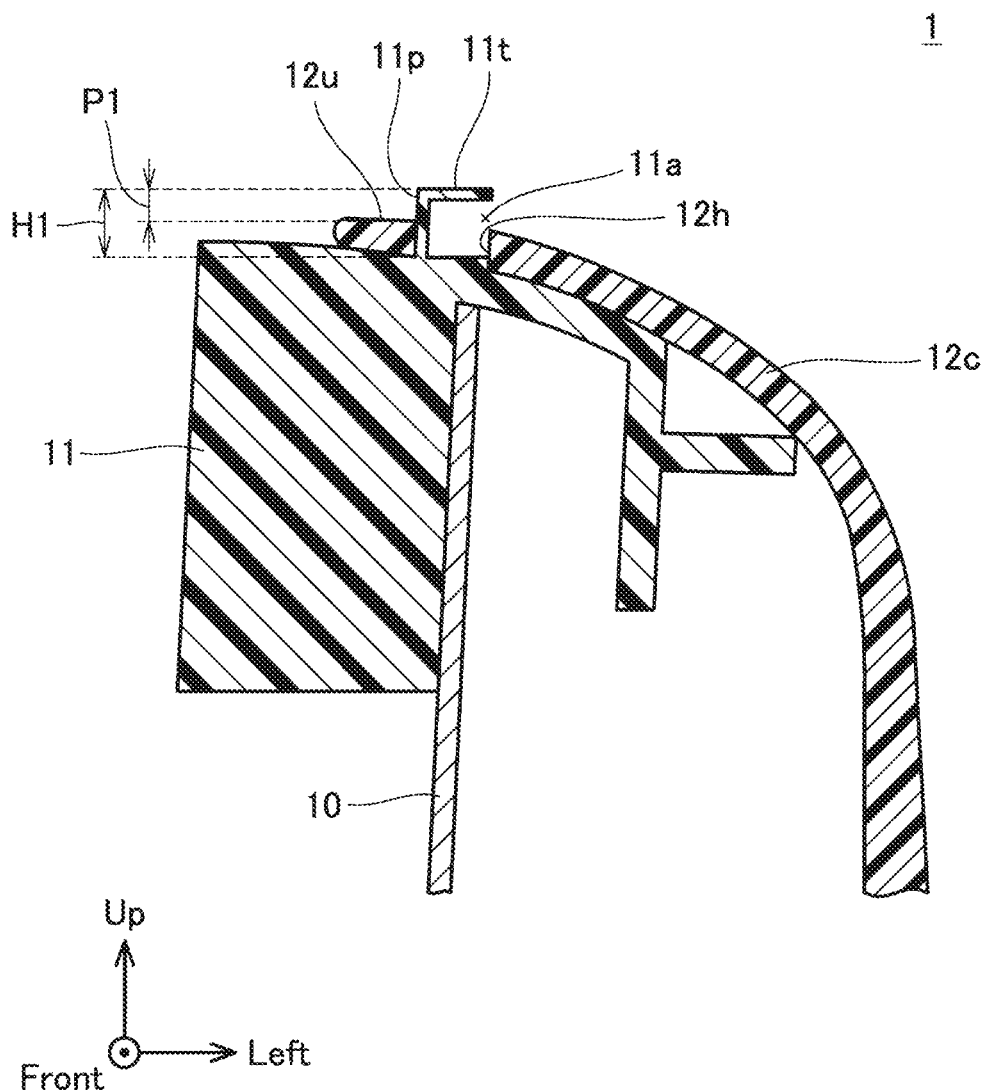
FIG. 3 is a sectional view taken along plane III-III in FIG. 2.

A structure of a side door 1 will be described. FIG. 1 illustrates a side view of a side door 1 in a front side of a vehicle. FIG. 2 illustrates an enlarged perspective view of a corner piece 11 and the vicinity thereof. FIG. 3 illustrates a sectional view taken along plane II-III in FIG. 2. The plane III-III is a plane that passes through the center of the protrusion 11*p*. FIGS. 1 through 3 illustrate a state before a door trim 13 is attached. Accordingly, the protrusion 11*p* is in a state before deformation. "Front" in the coordinate system of FIGS. 1 through 3 indicates a forward direction of the vehicle. "Up" indicates an upward direction of the vehicle. "Left" indicates left when viewed forward from the rear side of the vehicle. The meanings of the axes in the coordinate system are the same in the following drawings as well.

The side door 1 includes a door inner panel 10, the corner piece 11, and a weather strip 12. The door inner panel 10 is a steel plate member that constitutes a door main body.

The corner piece 11 is a member disposed at a vehicle rear end-side (i.e., at a rear end-side in a vehicle front-rear direction) of a door waist portion 10w of the door inner panel 10. The door waist portion 10w is an upper end portion of the door inner panel 10, and is also referred to as a belt line. The corner piece 11 includes a protrusion 11p. The corner piece 11 is made of resin (i.e., the corner piece 11 is a resin corner piece) and can be manufactured by injection molding, for example.

Figure 4:
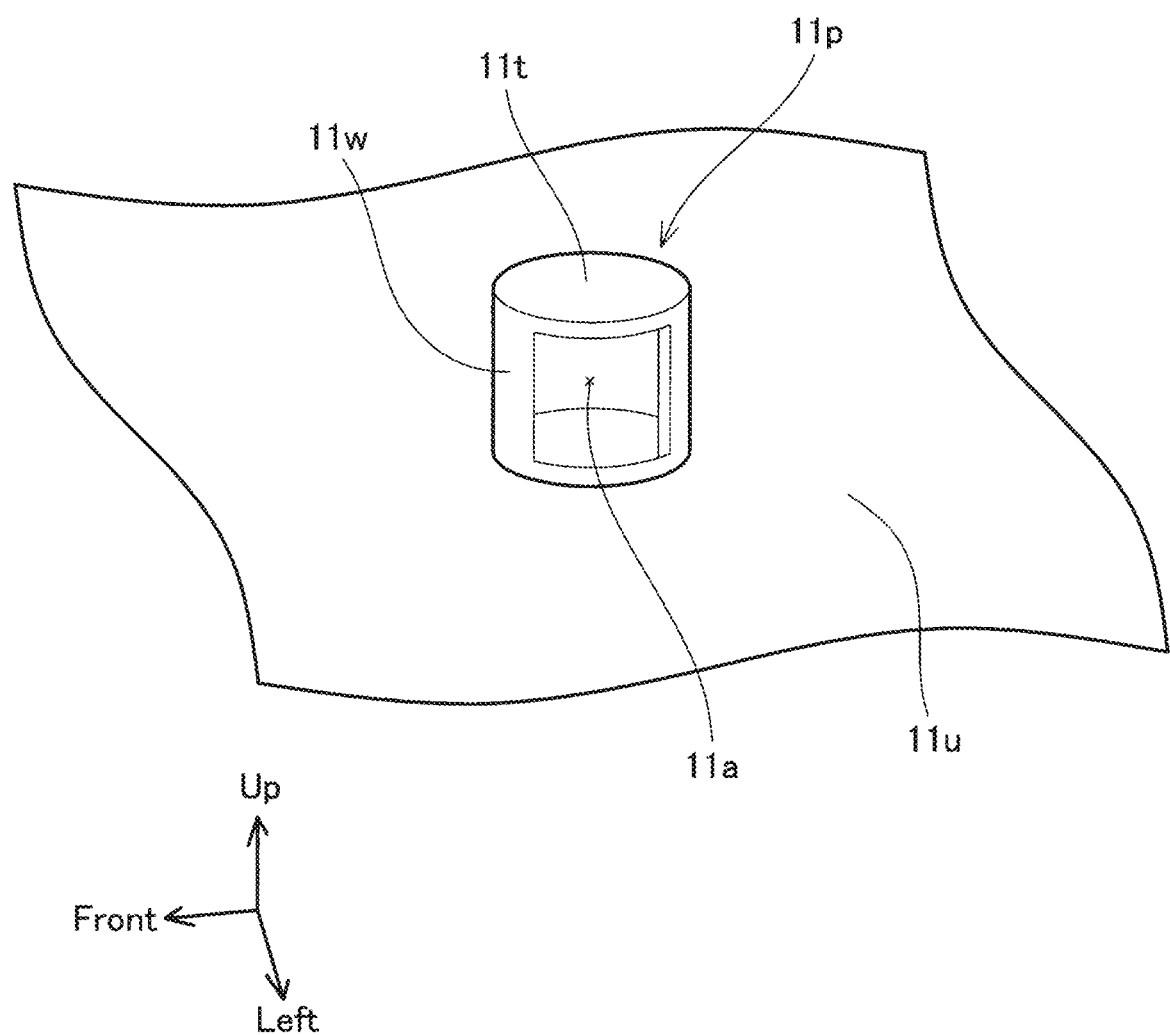
FIG. 4 is an enlarged perspective view of a protrusion 11*p*.

FIG. 4 illustrates an enlarged perspective view of the protrusion 11p. In FIG. 4, the weather strip 12 is omitted from illustration. The protrusion 11p is formed on an upper face 11u of the corner piece 11. The protrusion 11p is formed integrally with the corner piece 11. The protrusion 11p has a hollow structure including aside wall 11w on an outer periphery. A distal end face 11t is formed at a distal end of the protrusion 11p, and thus, the distal end is closed. An opening 11a is formed in apart of the side wall 11w. The opening 11a is connected to the hollow space formed inside the protrusion 11p. That is to say, the protrusion 11p has a cylindrical shape that is provided with a lateral hole, and that has a hollow space defined inside the protrusion 11p.

The weather strip 12 includes an outer peripheral portion 12p and a connecting portion 12c. The outer peripheral portion 12p is disposed to extend along an outer peripheral edge of a door panel, on the cabin side. The outer peripheral portion 12p functions as a strip-shaped seal member that fills in a gap between the door and a body. The connecting portion 12c is disposed in the door waist portion 10w, so as to cover a part of the corner piece 11. The connecting portion 12c is integrally formed with the outer peripheral portion 12p, and is formed of the same material as the material of the outer peripheral portion 12p. The thickness of the connecting portion 12c is larger than that of the outer peripheral portion 12p, and the connecting portion 12c has high rigidity. The connecting portion 12c includes a hole portion 12h. The protrusion 11p extends through the hole portion 12h, and thus, the hole portion 12h is engaged with the protrusion 11p.

A process of assembling the side door 1 will be described. First, the corner piece 11 is assembled to the door inner panel 10. Next, the hole portion 12h of the connecting portion 12c of the weather strip 12 is engaged with the protrusion 11p of the corner piece 11. Thus, the distal end face 11t of the protrusion 11p projects from an upper face 12u of the connecting portion 12c by a projection amount P1, as illustrated in FIG. 3.

Figure 5:
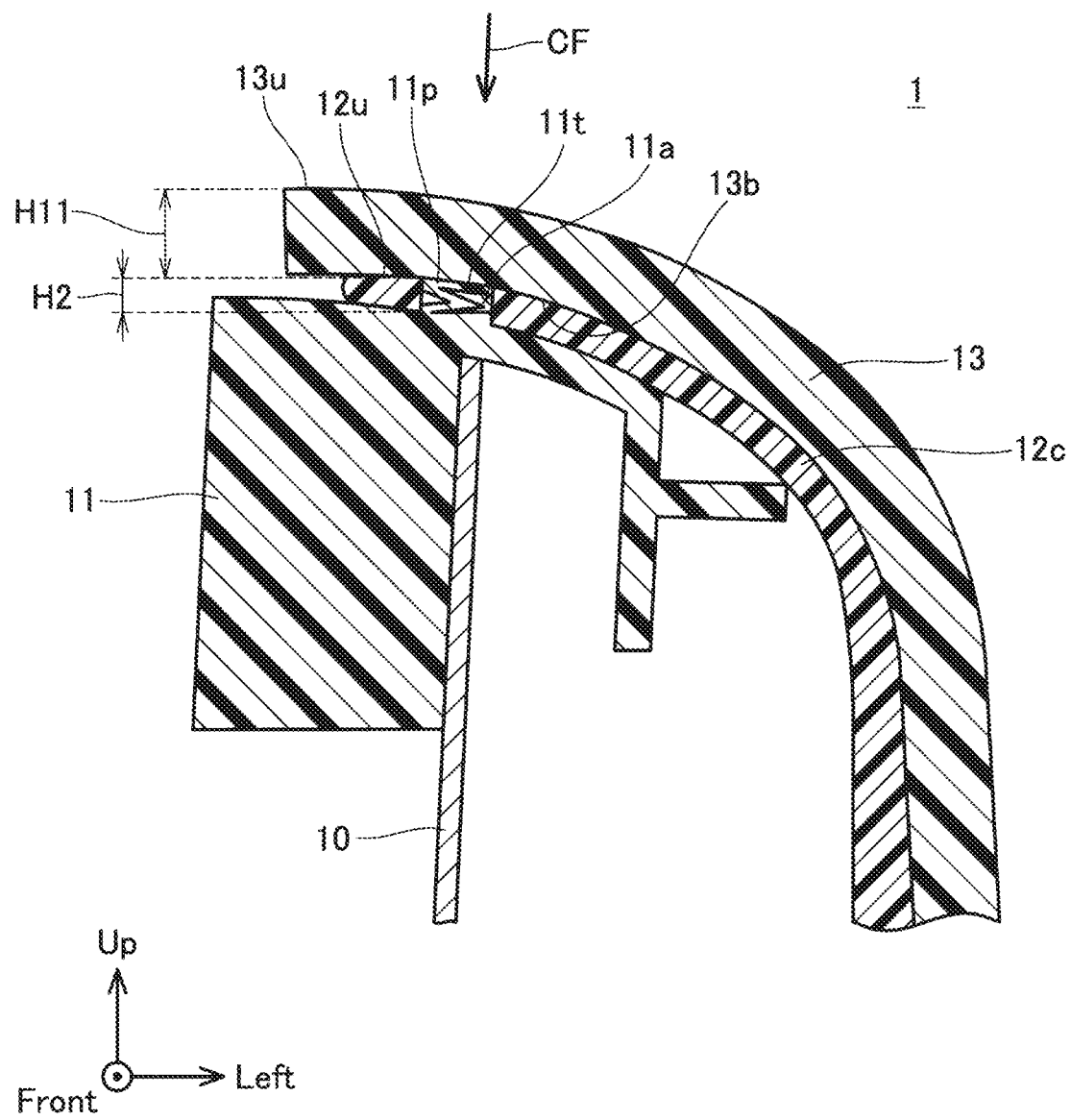
FIG. 5 is a sectional view after a door trim 13 is attached.

Thereafter, the door trim 13 is attached so as to cover the corner piece 11, as illustrated in FIG. 5. The door trim 13 is a lining component on the cabin side of the door. When the door trim 13 is attached, a reverse face 13b of the door trim 13 comes into contact with the distal end face 11t. As a result, compressive force CF is applied to the protrusion 11p.

The protrusion 11p has a hollow structure and the opening 11a is formed in a part of the side wall 11w, thereby reducing compressive rigidity. Accordingly, the protrusion 11p can be deformed so as to buckle in the axial direction of the protrusion 11p by applying the compressive force CF, as illustrated in FIG. 5. The height of the protrusion 11p can be reduced from a height H1 before deformation (FIG. 3) to a height H2 after deformation (FIG. 5). As a result, the distal end face 11t of the protrusion 11p hardly projects from the upper face 12u of the weather strip 12.

Figure 6:
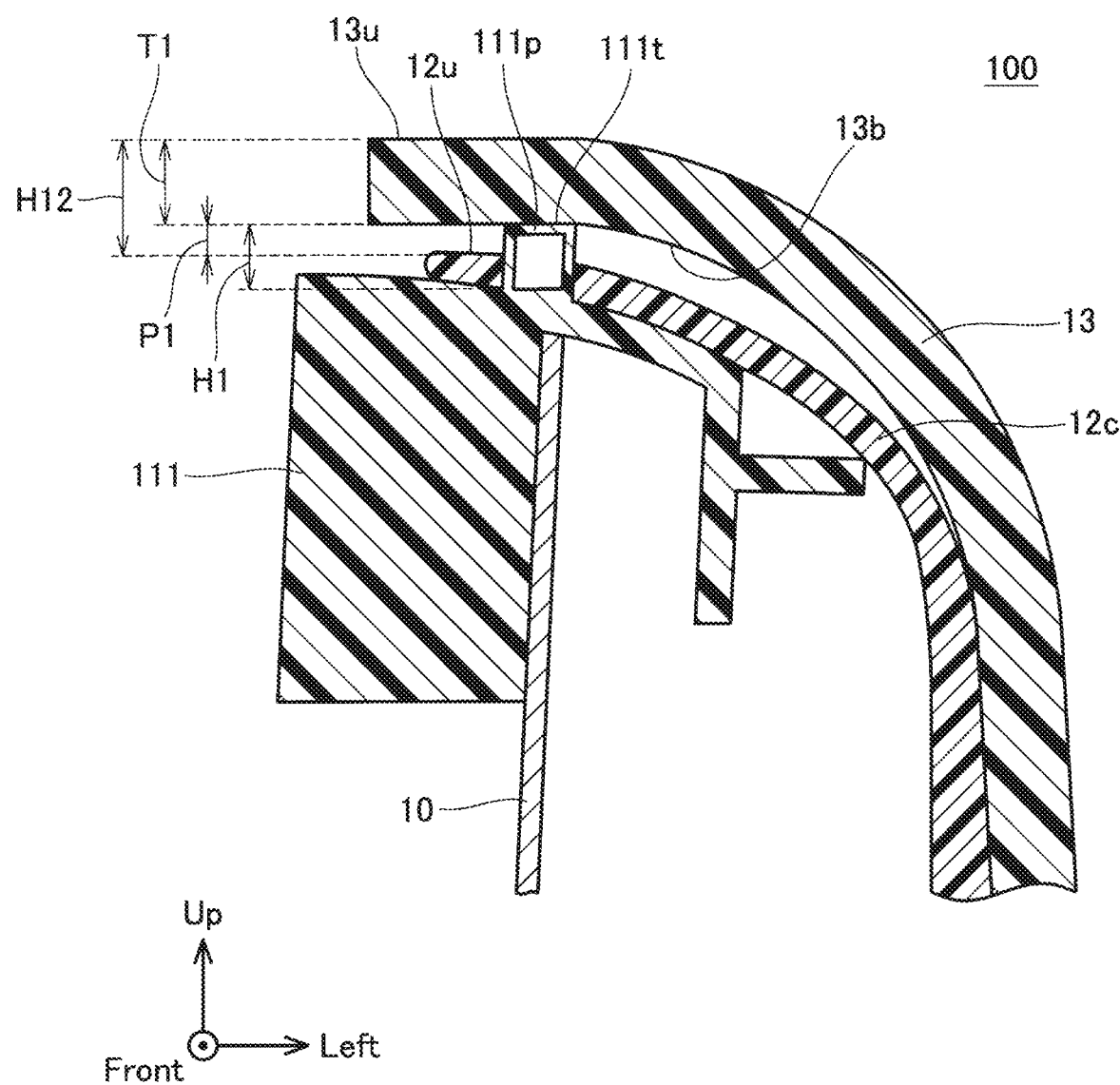
FIG. 6 is a sectional view illustrating a structure of a side door 100 according to a comparative example.

Effects of the first embodiment will be described. FIG. 6 illustrates a structure of aside door 100 according to a comparative example. FIG. 6 is a sectional view similar to that of FIG. 5. The opening 11a is not formed in a protrusion 111p of a corner piece 111 according to the comparative example. Accordingly, the compression rigidity of the protrusion 111p is high. The door trim 13 is provided with a trim upper face 13u above the door waist portion 10w. The reverse face 13b of the door trim 13 is in contact with a distal end face 11t of the protrusion 111p. A height H12 of the trim upper face 13u from the upper face 12u is the sum of the projection amount P1 of the protrusion 111p and a thickness T1 of the door trim 13. That is to say, the trim upper face 13u is displaced upward by an amount equivalent to the projection amount P1. On the other hand, in the side door 1 (FIG. 5) according to the present embodiment, the protrusion 11p has the hollow structure, and the opening 11a is formed in apart of the side wall 11w. As described above, the height can be lowered by deforming the protrusion 11p, and accordingly the distal end face 11t can be restrained from projecting from the upper face 12u. A height H11 of the trim upper face 13u from the upper face 12u is not affected by the protrusion 11p. The height H11 of the trim upper face 13u of the present embodiment (FIG. 5) can be made lower than the height H12 of the trim upper face 13u of the comparative example (FIG. 6). The degree of freedom in design can be increased.

When the side door 1 is assembled, the protrusion 11p can be in a high state having the height H1, as illustrated in FIG. 3. The process of engaging the hole portion 12h with the protrusion 11p can be easily performed. Also, the engaged hole portion 12h can be restrained from becoming disengaged during assembly. On the other hand, following completion of assembly of the side door 1, the protrusion 11p can be in a low state having the height H2, as illustrated in FIG. 5. The height of the trim upper face 13u can be reduced. Both simplification of the assembly process and improvement of the degree of freedom in design can be realized.

Second Embodiment

Figure 7:
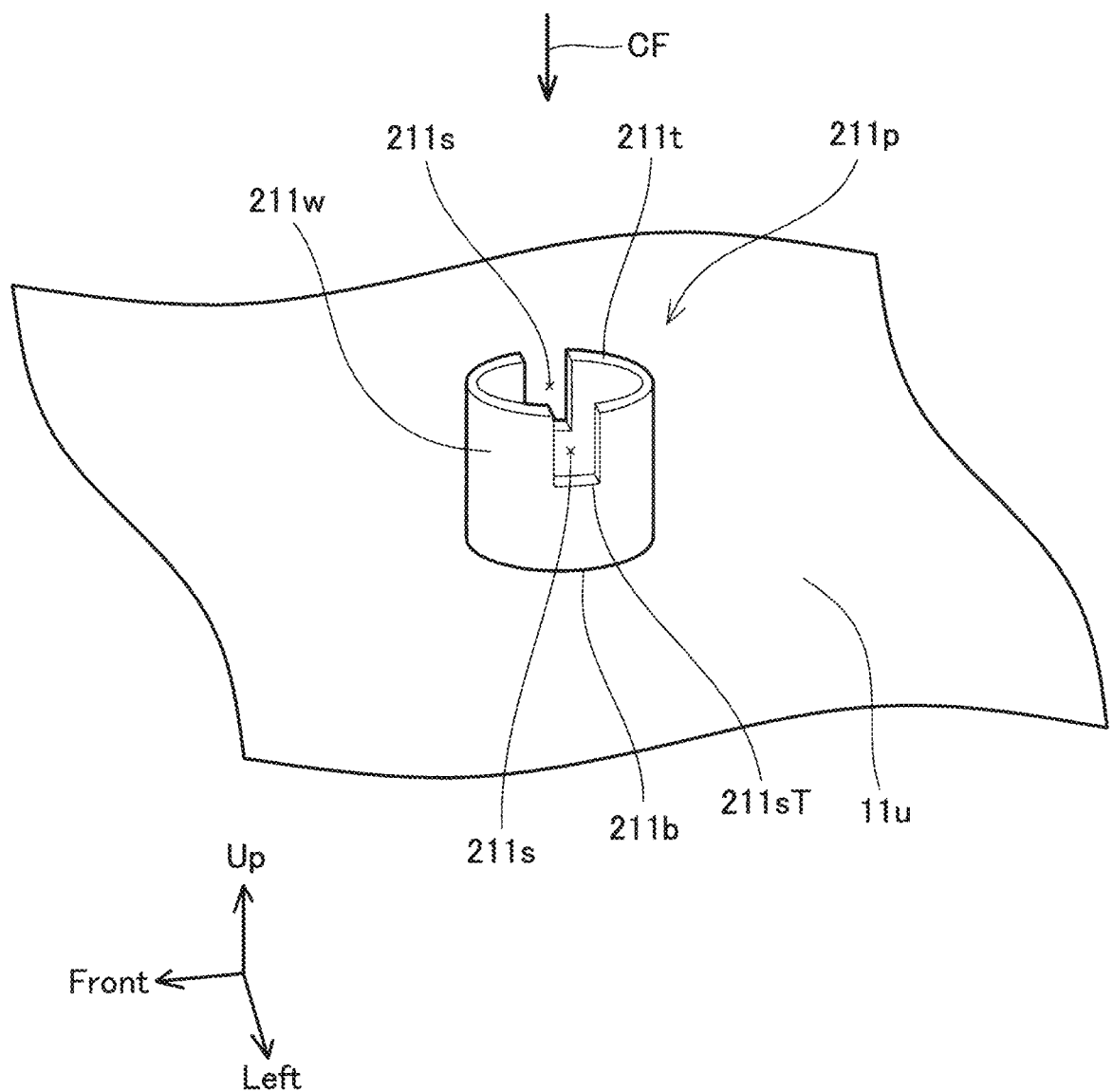
FIG. 7 is an enlarged perspective view of a protrusion 211*p* according to a second embodiment.

FIG. 7 is an enlarged perspective view of a protrusion 211p according to a second embodiment. The protrusion 211p has a hollow structure including a side wall 211w on the outer periphery thereof, and has a tubular shape in which a distal end 211t is open, i.e., a tubular shape with the distal end 211t that is open. Also, the protrusion 211p includes slits 211s extending from the distal end 211t toward a basal portion 211b. In other words, the slits 211s form openings in parts of the side wall 211w. Leading ends 211sT of the slits 211s do not reach the basal portion 211b. Note that other configurations of the second embodiment are the same as those in the first embodiment and accordingly description thereof will be omitted.

Effects of the second embodiment will be described. Providing the slits 211s in parts of the side wall 211w enables compressive rigidity of the protrusion 211p to be reduced. Accordingly, the protrusion 211p can be deformed so as to buckle in the axial direction of the protrusion 211p by applying the compressive force CF. The height of the protrusion 211p can be reduced, and accordingly the height of the trim upper face 13u can be lowered.

The leading ends 211sT of the slits 211s do not reach the basal portion 211b, and accordingly the compressive rigidity of the basal portion 211b can be ensured. Thus, a situation in which the basal portion 211b is damaged and the protrusion 211p falls off when the compressive force CF is applied can be restrained from occurring. Also, the compression rigidity on the side of the distal end 21 it can be made lower than that on the side of the basal portion 211b. The amount of deformation in the vicinity of the distal end 211t can be increased, and accordingly the amount of reduction in the height of the protrusion 211*p* can be sufficiently secured.

While specific examples of the disclosure have been described in detail above, these are merely exemplary, and do not limit the scope of the disclosure. The technology defined in the disclosure includes various modifications and alterations of the specific examples described above. The technical elements described herein or illustrated in the drawings exhibit technical utility alone or in various combinations, and are not limited to the combination described in the specific examples. The technology exemplified herein or illustrated in the drawings may simultaneously achieve a plurality of objects, and exhibit technical utility by achieving one of the objects.

Modifications

Figure 8:
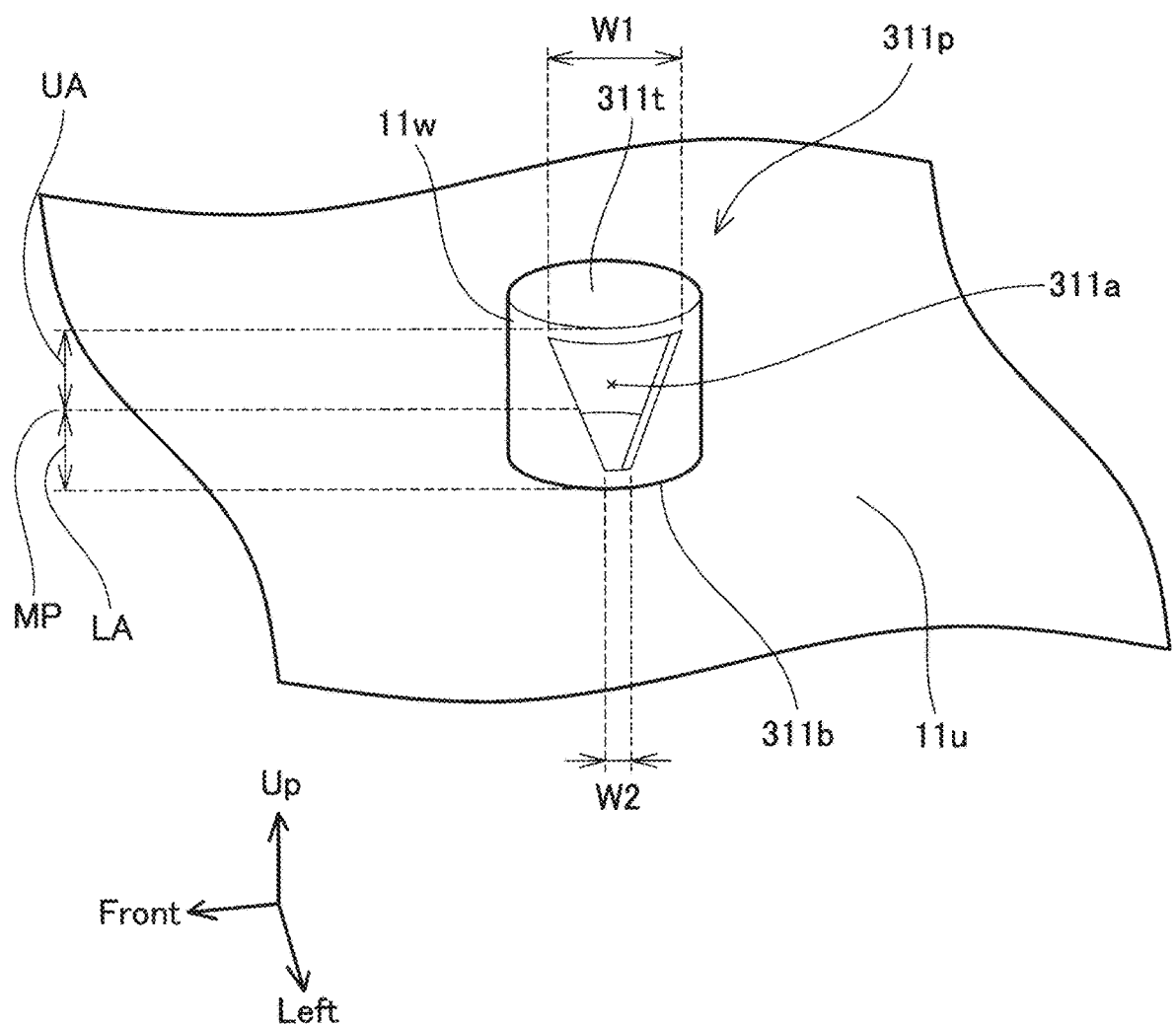
FIG. 8 is an enlarged perspective view of a protrusion 311*p* according to a modification.

FIG. 8 illustrates a protrusion 311*p* according to a modification. In an opening 311*a* of the protrusion 311*p*, a width W1 on the side of a distal end 311*t* of the protrusion 311*p* is larger than a width W2 on the side of a basal portion 311*b* of the protrusion 311*p*. Here, a middle position between the distal end 311*t* and the basal portion 311*b* is set as MP. A region from the middle position MP to the distal end 311*t* is defined as an upper region UA. A region from the middle position MP to the basal portion 311*b* is defined as a lower region LA. The area of the opening 311*a* in the upper region UA is larger than the area of the opening 311*a* in the lower region LA. Since the opening 311*a* is provided, the compressive rigidity on the side of the distal end 311*t* of the protrusion 311*p* can be made lower than the compressive rigidity on the side of the basal portion 311*b*.

Figure 9:
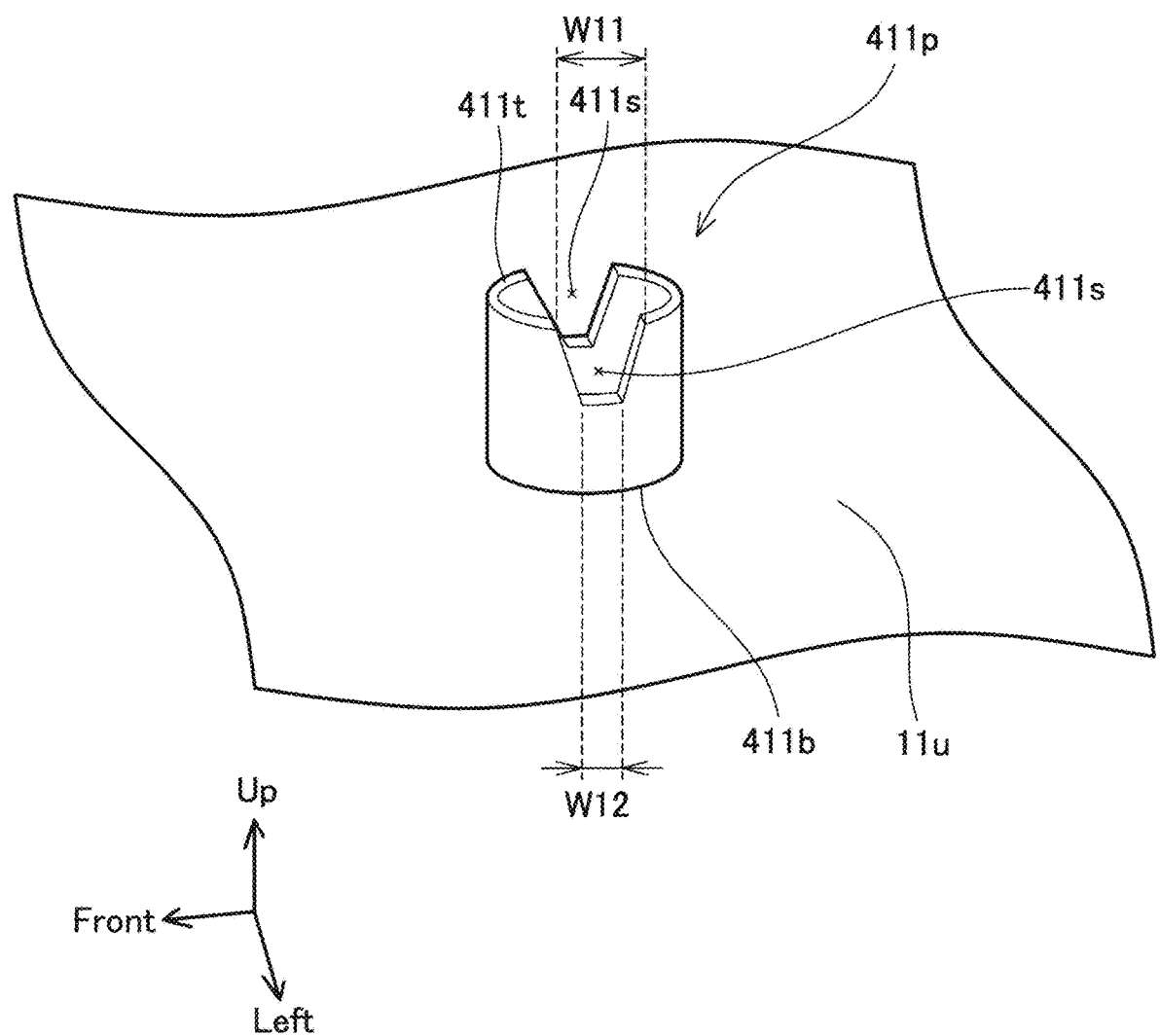
FIG. 9 is an enlarged perspective view of a protrusion 411*p* according to a modification.

FIG. 9 illustrates a protrusion 411*p* according to a modification. The protrusion 411*p* has slits 411*s*. The width of each slit 411*s* on the side of a distal end 411*t* of the protrusion 411*p* is W11, and the width of each slit 41 is on the side of a basal portion 411*b* is W12. The width W11 is larger than the width W12. Since the slits 411*s* are provided, the compressive rigidity on the side of the distal end 411*t* of the protrusion 411*p* can be made lower than the compressive rigidity on the side of the basal portion 411*b*.

The structure of the side door 1 in the front side of the vehicle has been described in each of the present embodiments, but the disclosure is not limited to the embodiments. The present technology can also be applied to a side door in the rear side of the vehicle.

An arrangement in which the protrusion is disposed on the upper face of the corner piece 11 has been described in each of the present embodiments, but this form is not limiting. The position of the protrusion may be on the side face of the corner piece 11. Thus, the projection amount of the door trim 13 toward the inside of the vehicle can be reduced, and accordingly the space inside the vehicle can be increased.

The protrusion 11*p* (FIG. 4) according to the first embodiment has been described as having one opening 11*a*, but this form is not limiting. Two or more openings 11*a* may be provided. The protrusion 211*p* (FIG. 7) according to the second embodiment has been described as having two slits 211*s*, but this form is not limiting. The number of slits 211*s* may be one, or may be three or more.

The opening 11*a* and the slits 211*s* are examples of openings.

What is claimed is:

1. A vehicle door comprising:
a door panel;
a corner piece that is disposed at a door waist portion of the door panel, the corner piece including a protrusion;
a weather strip that is disposed to extend along an outer peripheral edge of the door panel, the weather strip having a hole portion with which the protrusion is engaged; and
a door trim that is disposed to cover the corner piece, wherein the protrusion has a hollow structure and includes an outer peripheral side wall, and an opening is provided in a part of the outer peripheral side wall, wherein
the protrusion has a tubular shape with a distal end that is open;
the opening is a slit extending from the distal end of the protrusion toward a basal portion of the protrusion; and
a width of the slit on a side of the distal end of the protrusion is larger than a width of the slit on a side of the basal portion of the protrusion.

2. The vehicle door according to claim 1, wherein:
the opening is connected to a hollow space defined inside the protrusion.

3. The vehicle door according to claim 1, wherein a leading end of the slit does not reach the basal portion of the protrusion.

4. The vehicle door according to claim 1, wherein the corner piece is a resin corner piece.

* * * * *